US009704162B2

(12) United States Patent
Bhatia et al.

(10) Patent No.: US 9,704,162 B2
(45) Date of Patent: Jul. 11, 2017

(54) ENTERPRISE STRUCTURE CONFIGURATOR

(75) Inventors: Akash Bhatia, Mumbai (IN); Nigel King, San Mateo, CA (US); Timothy Dubois, Moss Beach, CA (US); Neil Ramsay, Madrid (ES)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 911 days.

(21) Appl. No.: 12/192,418

(22) Filed: Aug. 15, 2008

(65) Prior Publication Data

US 2009/0063549 A1 Mar. 5, 2009

Related U.S. Application Data

(60) Provisional application No. 60/956,898, filed on Aug. 20, 2007, provisional application No. 60/956,901, filed on Aug. 20, 2007.

(51) Int. Cl.
*G06Q 10/00* (2012.01)
*G06Q 30/00* (2012.01)

(52) U.S. Cl.
CPC .................................... *G06Q 30/00* (2013.01)

(58) Field of Classification Search
CPC .... G06Q 10/10; G06Q 10/0613; G06Q 10/06; G06Q 10/0631; G06Q 10/0637; G06Q 10/06375; G06Q 30/00
USPC .......................................................... 705/1.1
See application file for complete search history.

(56) References Cited

U.S. PATENT DOCUMENTS

| | | | | |
|---|---|---|---|---|
| 6,072,493 | A * | 6/2000 | Driskell et al. | 715/854 |
| 6,343,291 | B1 * | 1/2002 | Goldman | 707/802 |
| 6,473,794 | B1 | 10/2002 | Guheen et al. | |
| 6,626,959 | B1 * | 9/2003 | Moise et al. | 715/210 |
| 6,629,081 | B1 | 9/2003 | Cornelius et al. | |
| 6,668,253 | B1 * | 12/2003 | Thompson et al. | |
| 6,985,901 | B1 * | 1/2006 | Sachse et al. | |
| 6,985,955 | B2 | 1/2006 | Gullotta et al. | |
| 7,167,855 | B1 | 1/2007 | Koenig | |
| 7,562,308 | B2 * | 7/2009 | Pradhan et al. | 715/810 |

(Continued)

OTHER PUBLICATIONS

Dave Hawley, Change the color of cells in the pivot table, Jan. 24, 2003, http://www.ozgrid.com/forum/showthread.php?t=48003, pp. 1-2.*

(Continued)

*Primary Examiner* — Maria C Santos-Diaz
(74) *Attorney, Agent, or Firm* — Kilpatrick Towsend & Stockton LLP

(57) ABSTRACT

Tools for configuring an enterprise applications. In one aspect, the tools provide a user interface to allow an implementer describe, based on an interview with executives of the organization, an enterprise structure of an organization, and a data structure generator to configure the enterprise application to reflect this enterprise structure. In one aspect, these tools can allow a general case to guide the default assignment of intersections of legal and managerial reporting structures to a business unit, allowing the minimum number of business units to fulfill both the external and managerial responsibilities. The tools may implement a pivot table approach to provide an interface for the user to provide such input.

34 Claims, 5 Drawing Sheets

(56) References Cited

U.S. PATENT DOCUMENTS

| | | | |
|---|---|---|---|
| 7,650,633 B2 | 1/2010 | Whitson | |
| 7,657,471 B1* | 2/2010 | Sankaran et al. | 705/35 |
| 7,693,844 B1* | 4/2010 | Bobbitt et al. | 707/999.1 |
| 7,712,127 B1 | 5/2010 | Thompson et al. | |
| 7,823,189 B2 | 10/2010 | Patrick | |
| 7,870,595 B2 | 1/2011 | Finney et al. | |
| 2001/0034693 A1 | 10/2001 | Farhat et al. | |
| 2001/0034704 A1 | 10/2001 | Farhat et al. | |
| 2002/0026592 A1 | 2/2002 | Gavrila et al. | |
| 2002/0046074 A1 | 4/2002 | Barton | |
| 2002/0059404 A1 | 5/2002 | Schaaf et al. | |
| 2002/0087344 A1 | 7/2002 | Billings et al. | |
| 2002/0107792 A1 | 8/2002 | Anderson | |
| 2002/0178119 A1 | 11/2002 | Griffin et al. | |
| 2003/0028451 A1 | 2/2003 | Ananian | |
| 2003/0055788 A1 | 3/2003 | Sakuma et al. | |
| 2003/0078815 A1 | 4/2003 | Parsons | |
| 2003/0097319 A1 | 5/2003 | Moldovan et al. | |
| 2003/0158768 A1 | 8/2003 | Maeda | |
| 2003/0182461 A1 | 9/2003 | Stelting et al. | |
| 2004/0064351 A1 | 4/2004 | Mikurak | |
| 2004/0098594 A1 | 5/2004 | Fleming et al. | |
| 2004/0107131 A1* | 6/2004 | Wilkerson et al. | 705/10 |
| 2004/0162771 A1* | 8/2004 | Tamatsu et al. | 705/30 |
| 2004/0210528 A1 | 10/2004 | Guion et al. | |
| 2005/0010429 A1 | 1/2005 | Zipple et al. | |
| 2005/0108021 A1 | 5/2005 | Anderson et al. | |
| 2005/0246215 A1 | 11/2005 | Rackham | |
| 2006/0041505 A1 | 2/2006 | Enyart | |
| 2006/0178918 A1 | 8/2006 | Mikurak | |
| 2006/0190486 A1 | 8/2006 | Zhou et al. | |
| 2006/0229896 A1 | 10/2006 | Rosen et al. | |
| 2007/0027829 A1* | 2/2007 | Graf | 707/1 |
| 2007/0088730 A1 | 4/2007 | Mason et al. | |
| 2007/0156500 A1* | 7/2007 | Merkel et al. | 705/9 |
| 2007/0174390 A1 | 7/2007 | Silvain et al. | |
| 2007/0214497 A1 | 9/2007 | Montgomery et al. | |
| 2007/0226090 A1 | 9/2007 | Stratton | |
| 2008/0021716 A1 | 1/2008 | Buss et al. | |
| 2008/0077530 A1 | 3/2008 | Banas et al. | |
| 2008/0098485 A1 | 4/2008 | Chiou | |
| 2008/0205295 A1* | 8/2008 | Saba | 370/254 |
| 2009/0006113 A1* | 1/2009 | Robertson et al. | 705/1 |
| 2009/0183244 A1 | 7/2009 | Saraf et al. | |
| 2009/0204416 A1 | 8/2009 | King et al. | |
| 2009/0222297 A1 | 9/2009 | Cao et al. | |
| 2009/0222366 A1 | 9/2009 | Cao et al. | |
| 2010/0049573 A1 | 2/2010 | Kantorova et al. | |
| 2010/0312747 A1* | 12/2010 | Stolte et al. | 707/602 |
| 2011/0099030 A1 | 4/2011 | Besch et al. | |
| 2011/0288968 A1 | 11/2011 | King et al. | |

OTHER PUBLICATIONS www.Ozgrid.com, Conditional Formatting, Nov. 25, 2005 http://www.ozgrid.com/Excel/conditional-formatting.htm, pp. 1-2.* www.techonthenet.com, MS Excel: Change how empty cells are displayed in a pivot table in Excel 2003/XP/2000/97, Mar. 16, 2006, 1-4.*

Amy Bauer, Arbor ships first Microsoft Office compatible OLAP server, 1994, Bllsiness Wire, p. 1.*

U.S. Appl. No. 12/784,033, Office Action mailed May 22, 2012, 19 pages.

U.S. Appl. No. 12/195,070, Advisory Action dated Jun. 20, 2012, 3 pages.

U.S. Appl. No. 12/195,070, Final Office Action dated Mar. 30, 2012, 22 pages.

U.S. Appl. No. 12/195,070, Office Action mailed on Sep. 28, 2011, 19 pages.

White, Ron, "How Computers Work," 7th Edition, Oct. 2003, 65 pages, Que, Indianapolis, IN.

King, et al., "Processes and Apparatus to Generate Cross Charge and Recoveies for Shared Service Centers," U.S. Appl. No. 12/784,033, filed May 20, 2010, 35 pages.

Non-Final Office Action for U.S. Appl. No. 12/192,583, mailed on Mar. 1, 2011, 12 pages.

Final Office Action for U.S. Appl. No. 12/192,583, mailed on Aug. 15, 2011, 13 pages.

U.S. Appl. No. 12/192,583, Final Office Action mailed on Nov. 22, 2013, 30 pages.

U.S. Appl. No. 12/192,583, Final Office Action mailed on Feb. 12, 2013, 29 pages.

U.S. Appl. No. 12/195,070, Final Office Action Response filed on May 30, 2012, 16 pages.

U.S. Appl. No. 12/784,033, Advisory Action mailed on Mar. 7, 2013, 2 pages.

U.S. Appl. No. 12/784,033, Final Office Action mailed on Dec. 21, 2012, 19 pages.

U.S. Appl. No. 12/784,033, Non Final Office Action mailed on Sep. 11, 2013, 22 pages.

U.S. Appl. No. 12/784,033, Restriction Requirement mailed on Jan. 19, 2012, 7 pages.

U.S. Appl. No. 12/192,583, Non-Final Office Action mailed on Jun. 6, 2014, 38 pages.

U.S. Appl. No. 12/784,033, Final Office Action mailed on Mar. 10, 2014, 23 pages.

U.S. Appl. No. 12/192,583, Non-Final Office Action mailed on Jan. 23, 2015, 28 pages.

U.S. Appl. No. 12/195,070, Non-Final Office Action mailed on Apr. 2, 2015, 24 pages.

U.S. Appl. No. 12/784,033, Non-Final Office Action mailed on Mar. 25, 2015, 24 pages.

U.S. Appl. No. 12/784,033, Final Office Action mailed Sep. 17, 2015,all pages.

U.S. Appl. No. 12/784,033, Advisory Action mailed Dec. 8, 2015, all pages.

U.S. Appl. No. 12/192,583, Final Office Action mailed Aug. 13, 2015, all pages.

U.S. Appl. No. 12/195,070, Final Office Action mailed on Jun. 7, 2016, 28 pages.

U.S. Appl. No. 12/784,033, Non-Final Office Action mailed on Jun. 16, 2016, 31 pages.

U.S. Appl. No. 12/192,583, Non-Final Office Action mailed on Oct. 5, 2016, 35 pages.

* cited by examiner

ENTERPRISE STRUCTURE CONFIGURATOR

CROSS-REFERENCE TO RELATED APPLICATIONS

This application is a non-provisional application claiming the benefit, under 35 U.S.C. §119(e), of provisional U.S. Patent Application No. 60/956,898, titled "Enterprise Structure Configurator" and filed Aug. 20, 2007 by Akash Bhatia et al.

This application may be related to provisional U.S. Patent Application No. 60/956,901, titled "Business Unit Outsourcing Model" and filed Aug. 20, 2007 by Nigel King et al.

This application may also be related to U.S. patent application Ser. No. 12/192,583 titled "Business Unit Outsourcing Model" and filed on Aug. 15, 2008 by Nigel King et al.

The entire disclosure of each of the above applications is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to enterprise software applications in general and, more particularly, to tools for configuring enterprise software applications and/or defining data structures for enterprise software applications.

BACKGROUND

Many businesses (and other organizations) use software applications (and/or suites of such applications) to organize their business affairs, track business performance, and/or the like. Such applications (referred to herein as "enterprise applications") are often quite complex, relying on numerous database tables to store and manage data for virtually every aspect of an organization's business. Merely by way of example, enterprise applications can include supply chain management ("SCM") applications that manage raw materials, work-in-process and/or finished products, coordinate with suppliers, and/or the like; customer relations management ("CRM") applications that are used to track, store and/or manage customer information; financial applications that track and/or analyze the financial performance of the organization; human resources applications that provide management of the human resources functions of the organization; and/or the like. In some cases, these enterprise applications are standalone applications; in other cases, a single enterprise application (and/or suite of applications) might provide some or all such functionality. One type of enterprise application is referred to enterprise resource planning ("ERP") software. Examples of enterprise applications include, without limitation, JD Edwards EnterpriseOne™, PeopleSoft Enterprise™ applications, and the Oracle eBusiness Suite™, all available from Oracle Corporation.

For a variety of reasons, a modem business (or other organization) may be organized into several business units.

(A "business unit," as that term is used herein, means any group or function within a business that is viewed as a discrete entity for one or more purposes, such as for financial responsibility, for managerial reporting, for legal reporting, and/or the like.) These business units often are organized hierarchically in several ways. Merely by way of example, an enterprise might have a legal structure (i.e., a defined structure of corporations organized under the laws of one or more national or regional jurisdictions), a business structure (e.g., a defined organization of divisions arranged according to lines of business), and/or a functional structure (e.g., a reporting structure organized according to function, such as sales, human resources, research and development, etc.). Collectively, these modes of organization define a structural hierarchy of the enterprise, and each business unit typically resides at a certain point within each of these hierarchies.

As an enterprise deploys any application suite, it will need to represent both the internal and external reporting requirement in its enterprise structure. All enterprises must report to external investor and governmental bodies for each legal entity in the enterprise. An enterprise may organize for management and internal reporting in different ways. It is very likely that the management structure of the company influences the representation of business units within the enterprise application.

Thus, in implementing an enterprise application, it is important to understand the structural hierarchy of the organization for which the application is being implemented. For example, it is necessary to understand which business units have independent financial responsibility, so that a financial application can track and report on the individual finances of such organizations. Similarly, it may be important to understand where in the legal hierarchy a particular business falls; merely by way of example, a business unit might be subject to different employment laws, tax laws, export laws, etc., depending on which legal entity it is a part of.

Thus, a primary consideration in implementing an enterprise application for an organization is the identification of the various business units within the organization, and where each business unit falls within the structural hierarchy of the organization. In particular, the data structures of the enterprise application (including, inter alia, the structure and/or organization of the database tables on which the application relies) should model, or at least account for, the structural hierarchy of organization (that is, the organizational structure of the enterprise). Failure to account for the structural hierarchy of the organization when implementing an enterprise application generally will result in an unsatisfactory experience with the application, and possibly can require expensive re-engineering of the application at a later time.

Nonetheless, in the past, enterprise applications have not provided satisfactory tools for ascertaining the structural hierarchy of an organization, or for accounting for that structure when designing the data structures of the application's implementation. Merely by way of example, implementers in the past have had to resort to a time-consuming, iterative process of interviews with key executives to identify the various business units within an organization, and where those business units fall within the structure of the organization. Moreover, even after the completion of the process, it would often be discovered that certain business units had not been properly accounted for. Finally, even after the structure of the organization had been identified, mapping this structure into the data structures of the enterprise application generally required a manual, time-intensive process.

Hence, there is a need for more robust tools for identifying relationships between the various components of organizations, and/or for defining data structures of enterprise applications to account for these relationships.

BRIEF SUMMARY

Certain embodiments provide tools for defining data structures for enterprise applications. These data structures can include, without limitation, database tables used by an enterprise application, user interface components of an enterprise application, and/or the like. In one aspect, the tools provided by various embodiments provide a novel user interface to allow an implementer (who might be an executive at organization, a consultant, etc.) to relatively easily identify relationships between business units in the organization and various hierarchies within the organization (including, merely by way of example, legal hierarchies, business hierarchies, and/or functional reporting hierarchies).

In an aspect, some embodiments provide tools for an implementer to use when conducting an interview with the executives of the organization, describing how the enterprise is managed for both internal and external reporting. These tools can provide a facility that is connected to the enterprise structure definition within the applications. Hence, in some cases, the tools can allow a general case to guide the default assignment of intersections of legal and managerial reporting structures to a business unit, allowing the minimum number of business units to fulfill both the external and managerial responsibilities.

In a set of embodiments, for example, a pivot table approach is used to display one hierarchy (such as a legal hierarchy) on one axis of a grid, with one or more hierarchies displayed along another axis of the grid. Advantageously, the use of a pivot table approach allows for the display of multidimensional values in a two-dimensional grid structure. Merely by way of example, an axis of the grid might be categorized according to a first dimension (such as a business structure) into sets of columns, with each set of columns comprising multiple columns representing values along a second dimension (such as a functional structure). In aspect, the user interface can allow the user to choose which dimension should be primary on this axis (i.e., which dimension should be used for the categories). In another aspect, the user interface might allow the user to select which values from each dimension should be displayed on the respective axes of the grid, to provide varying levels of focus in examining the structural hierarchy of the organization.

In some embodiments, the pivot table is used to allow the user to provide input about the respective positions of the business units within the organization's structural hierarchy. In an aspect, for example, each cell in the pivot table might have an input field (which could be, for example, a text field, check box, etc.) to indicate that a business unit falls within the structure indicated by the row and column that intersect to form the cell. As noted above, in an aspect, the tools provided by various embodiments can be configured to create and/or modify a data structure (such as a database, one or more tables in the database, etc.) used by an enterprise application. This user input can be used to determine how the data structures used by the enterprise application should be structured and/or organized.

The tools provided by various embodiments include, without limitation, methods, systems, and/or software products. Mainly by way of example, a method might comprise one or more procedures, any or all of which are executed by a computer system.

Correspondingly, a computer system might be configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like). In a particular embodiment, the set of instructions might be incorporated within an enterprise application and/or might be provided as a separate computer program that can be used to configure the enterprise application.

An exemplary method of defining a data structure for an enterprise application might comprise providing a user interface for a user to define a structural hierarchy of an organization that comprises one or more business units. The structural hierarchy, in an aspect, might comprise a plurality of hierarchies according to which the organization is organized. Examples of possible hierarchies include, without limitation, a legal structure, a business structure, and/or a functional structure. In particular embodiments, the structural hierarchy of the organization includes a first hierarchy and a second hierarchy. In a particular aspect, the structural hierarchy might comprise structure comprising one or more legal entities, a business structure might comprise one or more divisions, and a functional structure comprising one or more management functions and/or units.

In an embodiment, the method further comprises receiving (e.g., via a user interface), a set of information about the organization. The set of information, in an aspect, comprises an identification of each of one or more entities in the first hierarchy and an identification of each of one or more entities in the second hierarchy (e.g., an identification of each of one or more legal entities, divisions and/or functional units). In another embodiment, the method comprises receiving a set of user input defining a relationship between each of one of more business units and each of the hierarchies. Merely by way of example, the set of user input might comprise a first user input indicating that a first business unit is part of a first entity within the first hierarchy and part of a second entity within the second hierarchy.

In a set of embodiments, the method comprises displaying for the user (e.g., via the user interface) a pivot table comprising a plurality of cells. In one aspect, the pivot table is defined by a first axis and a second axis. The first axis might correspond to the legal structure of the organization, and the second axis might correspond to the business structure and/or the functional structure of the organization. In a sense, the first and second axes collectively can be thought of as defining a grid comprising a plurality of cells. The first user input, then, might be in a first cell of the pivot table, which is defined by the intersection of a row of the pivot table representing a first legal entity and a column of the pivot table representing a first division and a first functional unit. Accordingly, the first user input might indicate that a first business unit is part of the first division, the first functional unit, and the first legal entity.

The method might further comprise configuring an enterprise application to account for a relationship defined by the user, based at least in part on the set of user input. Such configuration can include, in some cases, defining a data structure for the enterprise application. Merely by way of example, the method might comprise generating and/or modifying one or more database tables used by the enterprise application. These table(s) might be stored on a computer readable medium (e.g., within a database on a computer readable medium).

An exemplary computer system, in accordance with another set of embodiments, comprises one or more processors and one or more computer readable media (which might be computer readable storage media) in communication with the processor(s). In one embodiment, the media have stored thereon an enterprise application and/or a computer program (such as a configurator) for defining a data structure used by the enterprise application. The computer program, in an aspect, comprises a user interface component and a data structure generator component.

The user interface component might be configured to allow a user to define a structural hierarchy of the organization, which might comprise one or more business units. The structural hierarchy might comprise a plurality of hierarchies (such as a legal structure comprising one or more legal entities, a business structure comprising one or more divisions, and/or a functional structure comprising one or more functional units, etc.). The computer program might be configured to receive, via the user interface, a set of information about the organization, the set of information comprising an identification of each of the one or more legal entities, an identification of each of the one or more divisions, and/or an identification of each of the one or more functional units.

The computer program may be further configured to receive, via the user interface component, a set of user input defining a relationship between one or more business units, the legal structure, the business structure and the functional structure of the organization, the set of user input comprising a first user input indicating that a first business unit is part of a first division, a first functional unit, and a first legal entity. The data structure generator component, in an aspect, is configured to configure an enterprise application, based at least in part on the user input.

In some cases, the configurator and the enterprise application are integrated. In other cases, the configurator might be a separate program, and in fact might be executed on a computer different from the computer on which the enterprise application executes (or will execute after configuration).

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

Figure 1:
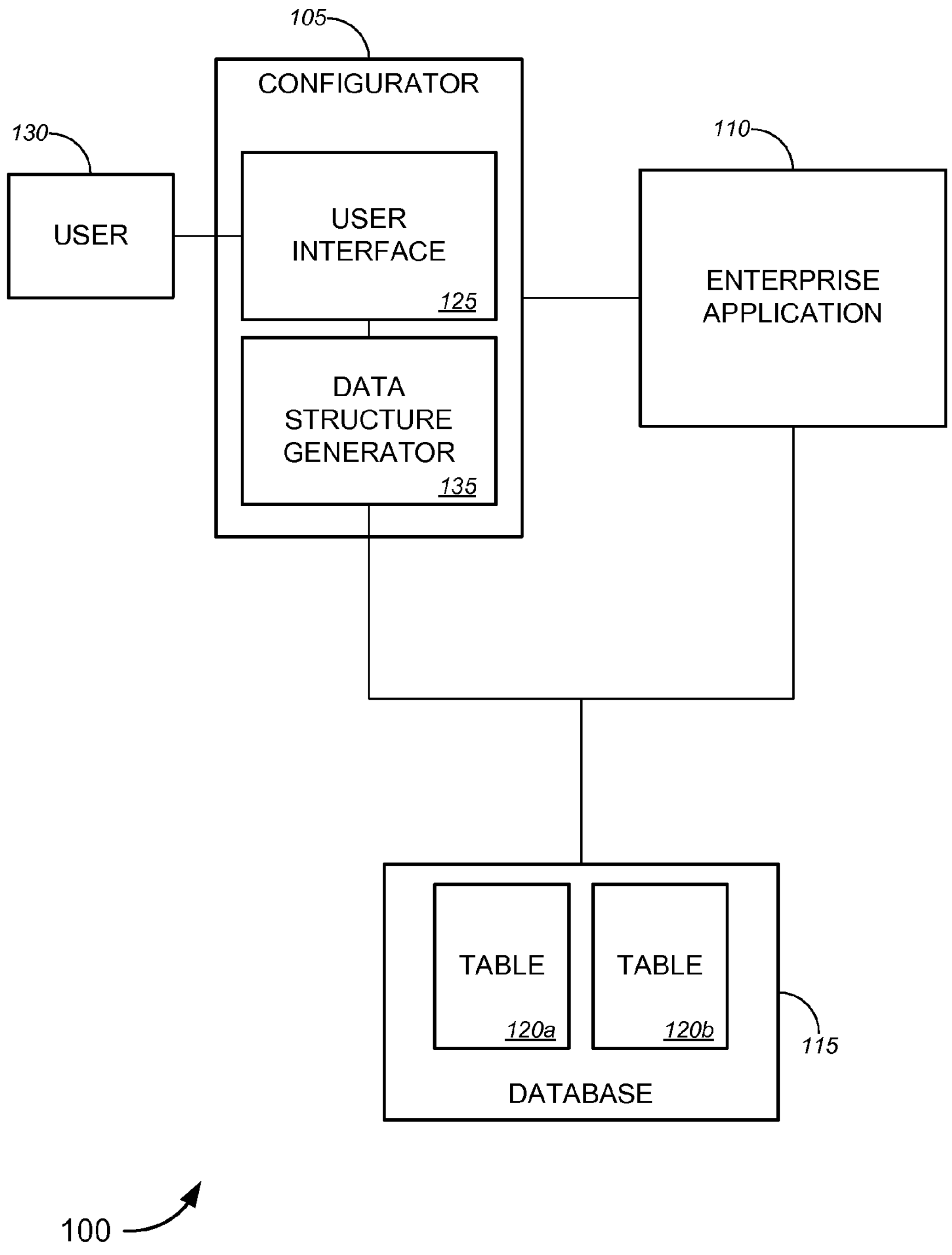
FIG. 1 is a block diagram illustrating software components of a system for defining a data structure for an enterprise application, in accordance with various embodiments of the invention.

While various aspects of embodiments of the invention have been summarized above, the following detailed description illustrates exemplary embodiments in further detail to enable one of skill in the art to practice one or more embodiments of the invention. In the following description, for the purposes of explanation, numerous specific details are set forth in order to provide a thorough understanding of the described embodiments. It will be apparent, however, to one skilled in the art that other embodiments may be practiced without some of these specific details. In other instances, well-known structures and devices are shown in block diagram form. Several embodiments are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments may lack such features.

In a general sense, a set of embodiments provides tools that can be used, for example, within an enterprise application (and/or in conjunction with an enterprise application) to configure the enterprise application to properly model the structural hierarchy of an organization that the enterprise application is to manage. (As used herein, an "organization," also referred to as an "enterprise," refers to any concern that is organized for a particular purpose. In many cases, an organization will be a for-profit or nonprofit corporation, or a collection of related corporations. An organization, of course, might comprise one or more unincorporated business forms as well.)

The "structural hierarchy" of an enterprise or organization, as that term as used herein, means the organizational structure of the enterprise, including any related companies within that enterprise. In many cases, the structural hierarchy of an organization can be viewed from many perspectives, including without limitation, a legal structure (e.g., a group of related corporations or other legal entities), a business structure (e.g., a hierarchy of divisions within the enterprise), a functional structure (e.g., groups within the enterprise organized by function, such as human resources, sales, etc.). In an aspect, the tools of the invention can be used to allow a user to input information about the structural hierarchy of the organization, which might comprise several different hierarchies within the organization.

Such hierarchies can include, without limitation, a legal structure, which might comprising one or more legal entities (e.g., corporations, etc.) within the organization; a business structure organized along lines of business (which might comprise, for example, one or more divisions); a functional hierarchy representing a reporting structure and/or functional organization (which might comprise one or more functional units and/or functions) within the enterprise; and/or the like. (Although the term "hierarchy" is often used herein to describe such relationships within the organization, it should be appreciated that the relationships need not be hierarchical in a strict sense. For example, a hierarchy might be a flat hierarchy, in which several entities exist as equals.

In other cases, several entities might be organized as a multiple-level hierarchy with a single top-level entity and other entities reporting, in various permutations, to that top-level entity. A variety of configurations are possible.) In a sense, then, such a hierarchy merely represents one (possibly of several) perspective by which an enterprise has organized its affairs. The organization's "structural hierarchy," then, represents a collection of these hierarchies, providing insight into the various perspectives by which the enterprise organizes itself.

In another aspect, tools provided by various embodiments can be used to apply this information in configuring, customizing, and/or implementing the enterprise application for use within the organization. In particular, some embodiments are used to configure the data structures used by the enterprise application to account for the organization's structural hierarchy. Merely by way of example, in a set of embodiments, the tools of the invention are designed to define a data structure used by the enterprise application (which might comprise generating and/or modifying a set of one or more database tables used by the enterprise application, and/or storing those tables on a storage medium) to facilitate and/or optimize the use of the enterprise application with the specific characteristics of the organization.

One set of embodiments provides a software program, referred to herein as a "configurator." FIG. 1 illustrates some of the functional components of system 100 implementing such a configurator 105, in conjunction with an enterprise application 110. In some embodiments, the configurator 105 might be incorporated within the enterprise application 110. In other embodiments, the configurator 105 is a separate program from the enterprise application 110. In such cases, the configurator 105 might be, but is not necessarily, implemented within an installation and/or configuration utility for the enterprise application 110.

In most cases, the enterprise application 110 uses a database 115 to store data generated, used and/or maintained by the enterprise application 110. The database 115 typically is a relational database comprising one or more database tables 120 configured to store the data (e.g., as records, etc.). The configuration of these tables 120 can have a significant impact on the performance, features and/or usability of the enterprise application. Accordingly, in an aspect, the configurator 105 is designed to define and/or configure these tables 120, based, in part, on information about the hierarchical structure of the organization for which the enterprise application is being implemented.

In an exemplary embodiment, the configurator 105 comprises a user interface component 125 that is designed to interact with a user 130 (e.g., via a computer operated by the user). While no specific hardware arrangement of the system 100 is depicted, it should be appreciated that a variety of hardware arrangements are possible. Merely by way of example, the user 130 might operate a client computer, on which the user interface component 125 displays information to allow the user 130 to interact with the configurator 105, which runs on a first server computer; the enterprise application 110 might run on a second server computer. In other embodiments, the configurator 105 might run on the same computer on which the user interface component 125 displays information for the user (e.g., a computer operated by the user) and/or the same computer on which the enterprise application 110 runs (and/or will run, after configuration). Other arrangements are possible as well. Exemplary hardware implementations are described in further detail below with respect to FIGS. 4 and 5.

It should also be appreciated that the configurator 105 (and, by extension, the user interface component 125) might be implemented in a variety of ways. Merely by way of example, the configurator 105 might be implemented as a web-based application, and the user interface component 125, accordingly, might be configured to provide interaction via a set of web pages (e.g., pages served by a web server, which might be integrated with, and/or separate from the configurator 105). In other embodiments, the configurator 105 might be configured to operate in a client-server configuration, or as a standalone application on a user computer (perhaps with facilities for communicating with the enterprise application 110 and/or database 115). Hence, the user interface component 120 might be configured to generate display screens (e.g., using tools provided by the operating system of the computer on which the configurator runs 105) for interaction with the user 125. One skilled in the art should appreciate, based on this disclosure, that there are many mechanisms for presenting a user interface to a user, and any of such mechanisms may be used in accordance with different embodiments of the invention.

In some embodiments, the configurator 105 also comprises a data structure generator 135, which is configured to communicate with the enterprise application 110 and/or database 115 to define data structures used by the enterprise application. Merely by way of example, the data structure generator 135 might be configured to modify and/or generate (e.g., create) one or more of the tables 120. (It should be noted that the term "generator" is used for convenience and should not be interpreted to mean that the configurator 105 necessarily must create any data structures; in some cases, the data structure generator 135 might be configured merely to modify existing data structures.)

The data structure generator 135 may be configured to receive, from the user interface component 125, input provided by the user 130, and/or to define the data structures based, at least in part, on this input. As an example, in some cases, the enterprise application 110 might be designed to maintain a table 120 (or set of tables) in the database 115 for each division in an organization. In such a case, if the user indicates (e.g., via the user interface component 125) that the organization has three divisions, the data structure generator 135 might create three tables 120 (or three sets of tables, if appropriate) in the database 115. As another example, the enterprise application might rely on a set of records in a particular table 120 in the database to represent relationships between various entities in an organization, and the data structure generator 135 might be configured to create appropriate records to reflect the structural hierarchy of the organization, based on input from the user.

Merely by way of example, in some embodiments, the enterprise application 110 stores a first table with a record defining each legal entity within an organization, a second table with a record defining each division within the organization, a third table with a record defining each functional unit within the organization, and a fourth table with a record defining each business unit within the organization. The data structure generator 135 might be configured to add appropriate records to each of these tables to define each of the legal entities, divisions, functional units, and business units defined in the user interface component 125. (If necessary, the data structure generator 135 might be configured to create these tables as well.) Depending on the implementation, the data structure generator 135 might also be configured to create data in the database (such as adding values to fields in existing records, adding additional records and/or adding/modifying relational links between records) to represent the reporting structure between various units/entities, as well as to define the relationship between a particular business unit and the legal entity, division and/or functional unit to which that business unit corresponds. (It should be noted that these examples are provided for illustration only and should not be considered limiting with respect to the functionality of the data structure generator 135.)

In some cases, the data structure generator 135 is equipped with any necessary communication facilities and/or protocols for communicating with the database 115 and/or the enterprise application. Merely by way of example, the data structure generator 135 might be configured to generate structured query language ("SQL") commands and transmit those commands to the database (using, for example, the SQL.net transport protocol, Oracle Networking services, etc.) for execution. As another example, the data structure generator 135 might be configured to access an application programming interface ("API") for the enterprise application 110 and/or database 115 to provide commands to define the structure of the data structures used by the enterprise application 110. Any of a variety of communication protocols, including without limitation protocols within the TCP/IP suite, might be used by the configurator 105 (and/or components thereof) to communicate with users, other system components, and/or the like.

In one aspect, the user interface component 125 may provide a user interface for the user to identify and/or describe relationships between various business units and the structural hierarchy of the organization. Merely by way of example, certain embodiments of the invention are configured to display a table representing the structural hierarchy of the organization. Because the structural hierarchy might be multi-dimensional (i.e., might comprise hierarchies along several dimensions, such as legal entities, divisions, functional units, and the like), certain embodiments employ a pivot table approach to displaying the structural hierarchy of the organization.

Figure 2A:
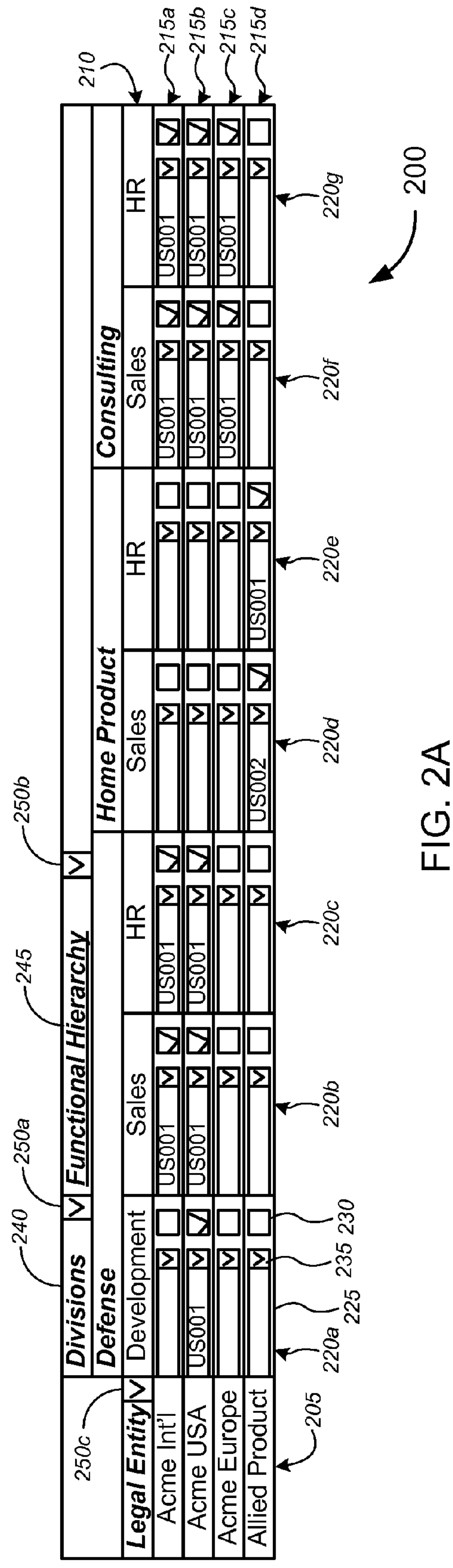
FIGS. 2A and 2B illustrate pivot tables in accordance with various embodiments of the invention.

An exemplary pivot table 200 is illustrated by FIG. 2A. In this example, the organization's structural hierarchy has three dimensions: a legal structure, a functional structure, and a business structure (i.e., a set of divisions). Thus, the exemplary pivot table 200 is defined by two axes; a first axis 205 is situated vertically and corresponds to the legal structure of the organization, while a second axis 210 is situated horizontally and corresponds to both the business structure and functional structure of the organization. The first axis defines a plurality of rows 215, each of which corresponds to a legal entity within the legal structure of the organization (e.g., row 215*a* corresponds to a legal entity called "Acme Int'l," row 215*b* corresponds to a legal entity called "ACME USA", row 215*c* corresponds to "ACME Europe" and row 215*d* corresponds to "Allied Product").

The second axis 210 defines a plurality of columns 220, each of which corresponds to a particular combination of a functional unit (within the functional structure) and a division (within the business structure). In this example, the business structure is considered the "primary" dimension of the axis 210, and the columns 220 therefore are categorized according to the business structure (i.e., there is set of columns corresponding to each of one or more divisions in the business structure). For example, a first set of columns includes columns 220*a*, 220*b* and 220*c*, and it corresponds to a "Defense" division within the business structure of the organization. Within that set of columns, there is a column 220*a* that corresponds to a "Development" function within a functional hierarchy, another column 220*b* that corresponds to a "Sales" function, and there is a third column 220*c* that corresponds to an "HR" function. (It should be noted that all of these functions—or "functional units"—fall within the "Defense" division.) Similarly, a second set of columns comprises columns 220*d* and 220*e*, which correspond, respectively, to a "Sales" function and an "HR" function within a "Home Product" division, and a third set of columns comprises two columns 220*f* and 220*g* that correspond to functions within a "Consulting" division.

It should be noted that the exemplary pivot table 200 is configured according to a hypothetical structural hierarchy of an organization, and that other arrangements are possible. Merely by way of example, any arrangement of the axes of the pivot table is possible; the first axis and second axis need not be arranged vertically and horizontally, respectively, (or even orthogonally, for that matter). Similarly, while the terms "row" and "column" are used for ease of description, these terms are not meant to imply, and should not be interpreted to mean, that rows necessarily are horizontally-oriented or that columns necessarily are vertically-oriented. Moreover, depending on the structural hierarchy of the organization being modeled, each axis might correspond to two (or more) hierarchies within the organization. In certain embodiments, not all of the different types of hierarchies need be supported. Merely by way of example, in some cases, the organization might be organized only by a legal hierarchy and a business hierarchy, with each division in a business hierarchy corresponding to a business unit. In such cases, the table 200 might simply have the business structure on one axis and the legal structure on the other axis.)

The two axes 205, 210 collectively form a grid comprising a plurality of cells (e.g., cell 225). In an aspect, each cell is defined by the intersection of a particular row 215 and a particular column 220. Thus, for example, in the illustrated embodiments, the cell 225 is defined by row 215*d* and column 220*a*. (For clarity and ease of illustration, only cell 225, and its respective components, described below, are labeled with reference numerals. It should be understood, however, that the term "cell" refers to each position defined by the intersection of a row 215 and column 220, and that each cell may have similar components to the cell 225 described in detail herein.) In the illustrated example, therefore, each cell (e.g., 225) represents a unique location within the structural hierarchy of the enterprise that can be occupied by a business unit.

In a particular set of embodiments, the table 200 is configured to allow the user to provide input at one or more cells (e.g., 225). A variety of different types of input are possible. Merely by way of example, the table 200 might provide, in some or all of the cells (e.g., 225), an interface element (e.g., 230), which in the illustrated example is a checkbox but might, in other embodiments, be any of a variety of interface elements, or "widgets," such as text fields, radio buttons, etc., to allow the user to provide input indicating that a business unit occupies the location in the structural hierarchy represented by that cell.

Additionally and/or alternatively, an interface element 235 (which in this case is a combo box, which allows a user to either pick a value from a list or type a new value, but which alternatively could be a different type of input element, such as a pick list, text field, etc.) may be provided, to allow the user to provide input identifying the business unit that occupies the location in the structural hierarchy represented by the cell. Merely by way of example, if the user is prompted to provide the names of all business units within the organization before the table 200 is displayed, the interface element 235 might provide a list populated with those provided names to allow the user to select an alreadyidentified business unit, and/or might allow the user to identify a new business unit by typing a new name into the interface element 235.

Optionally, the user interface might be configured to force the user to select (activate) the interface element 230 indicating that a business unit occupies the location represented by the cell 220 prior to allowing input via the interface element 235 (and/or, if input is received at the interface element 235, to automatically activate and/or select the interface element 230 to indicate that a business unit occupies the location represented by the cell 225).

In some cases, a particular business unit might occupy two or more locations in the structural hierarchy of the organization, and the user interface therefore might be configured to allow multiple cells (e.g. 225) to contain the same value for the business unit name (e.g., in field 235). In other cases, a business rule might dictate that each business unit may occupy only one location in the structural hierarchy, such that different cells cannot have the same value for the business unit name.

In the illustrated example, the pivot table reflects that there is a business unit ("US001") that falls within the "ACME USA" legal entity, and within the "Development" function in the functional structure and the "Defense" division within the business structure, respectively. The same business unit ("US001") also falls within the "Sales" and "HR" functions for the "Defense Division" for both "ACME Int'l" and "ACME USA," as well as the "HR" function in the "Home Product" division in the "Allied Product" legal entity and the "Sales" and "HR" functions in the "Consulting" division within the "ACME Int'l," "ACME USA," and "ACME Europe" legal entities. Another business unit, "US002" falls within the "Sales" function of the functional hierarchy, the "Home Product" division of the business hierarchy, and the "Allied Product" legal entity of the legal hierarchy. (In this example, a single business unit, such as "US001," is allowed to reside in multiple locations of each of the hierarchies. As noted above, however, other embodiments may restrict a given business unit to a single location in each hierarchy, i.e., one cell in the table 200.)

As mentioned above, some embodiments provide the user with enhanced flexibility when choosing how to view the structural hierarchy of the organization. Hence, for example, there may be provided one or more input elements 250, which, when selected, allow the user to limit the entities that are displayed in the table 200. Merely by way of example, if the user selects interface element 250*a*, the user interface might provide a pick list of the divisions within the business structure of the organization, allowing the user to pick which of the divisions should be displayed on the table 200. This can be beneficial for large organizations, which might have dozens, or hundreds, of divisions. The interface elements 250*b* and 250*c*, similarly, might provide facilities for the user to select which functions (within the functional structure) and legal entities (within the legal structure), respectively, should be displayed.

Alternatively and/or additionally, the table 200 might be configured as a pivot table, which provides the user with the option to configure the axes 205, 210 of the table 200. In some cases, the user might be allowed to choose which hierarchies(s) are displayed on which axis. In other cases, the correlation between each axis and one or more hierarchie(s) might be fixed, but the user might have the option of selecting which hierarchy is the primary dimension on a particular axis (e.g., by which hierarchy the axis is categorized). Merely by way of example, the horizontal axis 210 of the table 200 has the business structure as a primary dimension (as noted by the "Divisions" label 240), and, as described above, the columns 220 therefore are categorized (grouped) according to division, and subdivided within those categories according to function within the functional structure (as indicated by the "Functional Hierarchy" label 245). A facility might be provided, however, to allow the user to modify this display. For instance, in the illustrated table, 200, the label "Functional Hierarchy" is configured as an interface element (which might be, for example, a hyperlink in embodiments that provide the user interface via a web application) that is selectable by a user.

Figure 2B:
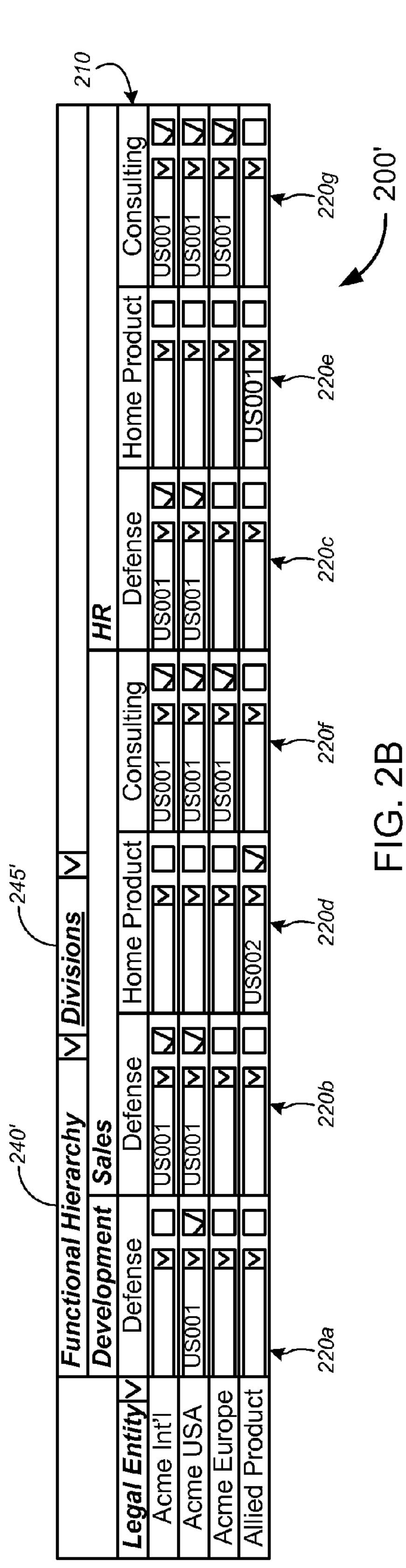

Upon receiving a command from the user (e.g., a selection of the label 245 or another interface element with similar function, the configurator might be configured to redisplay the table, perhaps in the form as illustrated by the table 200' of FIG. 2B. The table 200' of FIG. 2B is similar to the table 200 of FIG. 2A, except that the axis 210' has been reconfigured to display the functional hierarchy as the primary dimension (i.e., the dimension by which the columns 220 are categorized). Accordingly, the columns 220 in the table 200' are categorized into a first set of columns (including column 220*a*) corresponding to the "Development" function in the functional hierarchy, a second set of columns (including columns 220*b*, 220*d* and 220*f*) corresponding to the "Sales" function in the functional hierarchy, and a third set of columns (including columns 220*c*, 220*e* and 220*g*) corresponding to the "HR" function in the functional hierarchy. Accordingly, the labels 240' and 245' have been rearranged as well, to indicate that the functional hierarchy is the primary dimension for the axis 210 in this display. (Correspondingly, the label 245' for the business structure has become an interface element that can be selected to produce a table configured similarly to the table 200 of FIG. 2A.

It should be noted that the example tables 200 and 200' of FIGS. 2A and 2B, respectively, display the same set of relationships between business units and the various hierarchies of the organization. The difference, however, is in the way that the information is presented. Using the tools of various embodiments, a user can view (and/or provide input regarding) the structural hierarchy of an organization from a variety of different perspectives. Beneficially, this allows the user to be sure that every necessary relationship in the structural hierarchy of the organization has been identified, by "slicing and dicing" the view of the structural hierarchy in several different ways.

Figure 3:
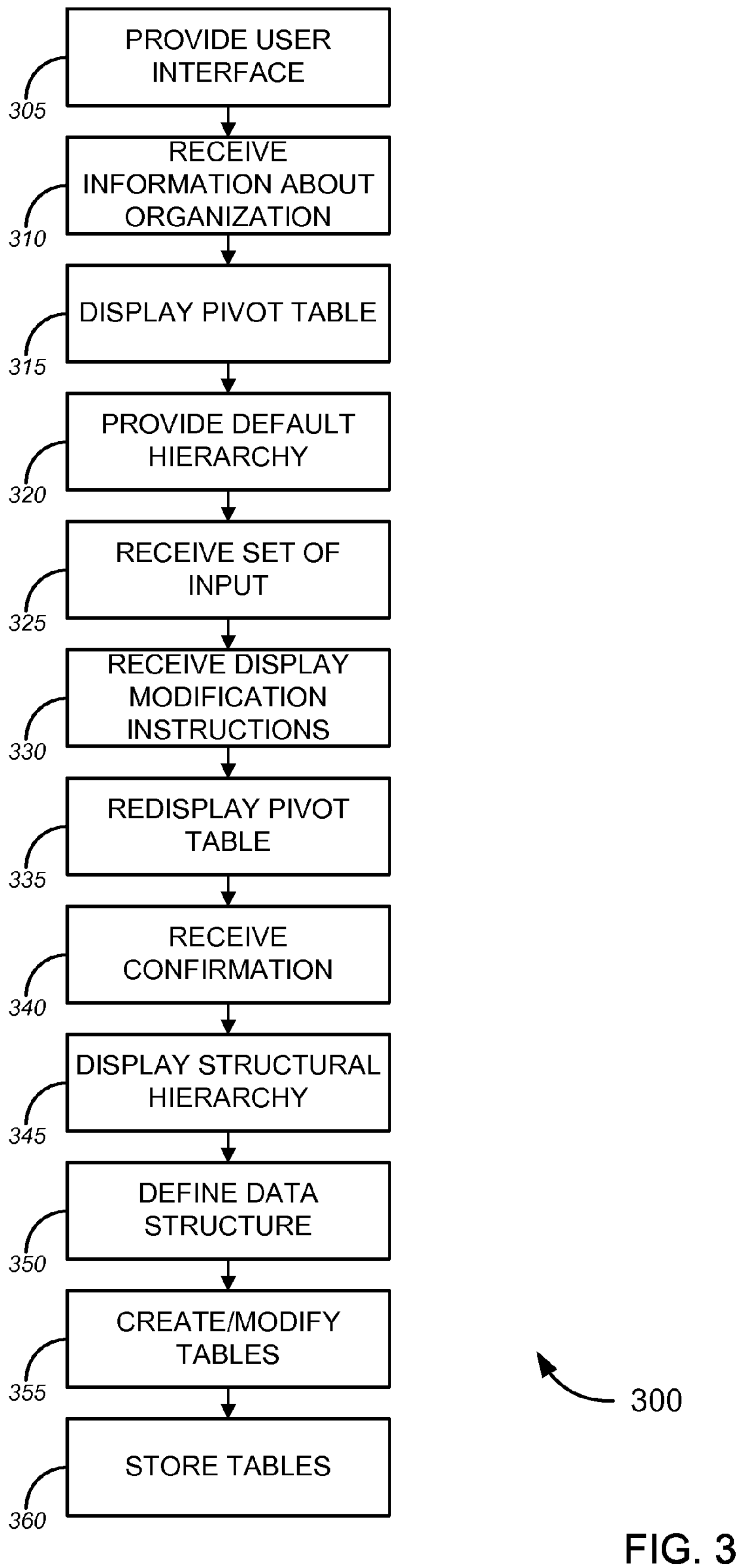
FIG. 3 is a process flow diagram illustrating a method of defining a data structure for an enterprise application, in accordance with various embodiments of the invention.

FIG. 3 illustrates a method 300 of defining a data structure for an enterprise application. In some embodiments, one or more procedures of the method 300 may be implemented by a software program, such as the configurator 105 described with respect to FIG. 1, and the method 300 therefore is described by reference to the system 100 illustrated by FIG. 1, although it should be appreciated that methods of the invention are not limited to any particular hardware or software implementation. Similarly, while various procedures in the method 300 may be performed using a table similar to the tables 200 and 200' of FIGS. 2A and 2B, it should be understood that not every embodiment of the invention necessarily will employ such tables.

The method 300 comprises providing a user interface (block 305) for a user to define a structural hierarchy of an organization. In some cases, a user interface component of a configurator program might provide the user interface, as described above. Merely by way of example, the user interface might be configured to receive input from a user and/or to display output for a user. In some (but not all) embodiments, the user interface is provided as a set of one or more web pages, and/or the user interface might comprise (and/or be configured to display) a table, such as the pivot table described above. Alternatively and/or additionally, a third party application might be used to provide the user interface. In some cases, a combination of these procedures may be used. Merely by way of example, in one embodiment, a configurator program might take input about an organization's structural hierarchy via a web page, and then generate a spreadsheet file (that can be used by a spreadsheet application), which displays a pivot table based on the information. After editing the pivot table with the spreadsheet application, the user might submit the file to the configurator, which gathers input in the form of modifications to the pivot table in the spreadsheet file.

The method 300 further comprises receiving information about the organization for which an enterprise application is implemented (block 310). The information, in a particular aspect, might comprise a definition of each hierarchy within the structural hierarchy, including without limitation identification of the hierarchies themselves, and/or an identification of each entity within each hierarchy. For instance, if the structural hierarchy of an organization comprises a legal hierarchy, a functional hierarchy and a business hierarchy, the information received by the configurator might include identification of these structures (hierarchies), as well as an identification of each legal entity within the legal hierarchy, each division within the business hierarchy and/or each function within the functional hierarchy. In some cases, the information about the structural hierarchy might be received by the user interface, e.g., using a web-based form, a set of input fields in an application, and/or the like. In other cases, the information might be received in some other way, such as through a text file, XML file, etc.

In addition to receiving information about the entities in each hierarchy, the configurator, in some cases, also receives information about the business units of the organization, and in particular aspects, the relationship between each business unit and each of the various hierarchies within the structural hierarchy of the organization. In some, but not all, cases, a table (e.g., a pivot table, such as the pivot table 200, 200' illustrated by FIGS. 2A and 2B) is the device used to allow the user to provide such input. Accordingly, in such cases, the method 200 comprises displaying a pivot table for the user (block 315). In a set of embodiments, the pivot table may be generated based on the information provided by the user about the various hierarchies within the organization (as described with respect to block 310 above, for example).

The pivot table, in an aspect, may be displayed via the user interface. For instance, in some embodiments, the user interface component of the configurator (and/or a web server in communication with the configurator) might generate a web page comprising the pivot table. In other embodiments, the pivot table might be drawn in a window managed by the user interface component. In other aspects, however, the configurator might create a pivot table for display in another application, such as a spreadsheet application, etc.

Optionally, the configurator might provide a default structural hierarchy for the organization (block 320), for example, by providing default values for various cells within a pivot table. This default structural hierarchy might be based on organizational structures commonly found within organizations similar to the organization for which the enterprise application is being implemented, on business rules relating to the various hierarchies identified by the user, etc.

The configurator receives a set of user input defining a relationship between some or all of the business units and one more of the hierarchies (e.g., a legal structure, business structure, functional structure, etc.) (block 325). In some cases, the user input is received via the user interface, and/or more specifically, as input to one or more fields in a table (such as a pivot table, to name one example). For instance, in an aspect, the user input might comprise a first user input at a cell of a pivot table, which is defined (as described above) by the intersection of a row and a column, respectively, of the pivot table. In one implementation, the row might represent an entity within one hierarchy, while the column might represent an entity within a second hierarchy as well as an entity within a third hierarchy. By providing input at a cell (such as selecting a checkbox and/or providing text input in a text input field, etc.), the user can indicate that a business unit exists (and perhaps identify the business unit) at the location in the structural hierarchy represented by the cell. Optionally, this process can be repeated as necessary and/or desired to provide input on each business unit within the organization. Collectively, these inputs may form the set of user input.

In some cases, the user might wish to view the structural hierarchy of the enterprise by a different perspective. Accordingly, the method 300 might comprise receiving a set of display modification instructions from the user (block 335). Merely by way of example, as noted above, the user might wish to view one of the multi-dimension axes with a different primary dimension (i.e., categorized by a different hierarchy). The user, then, might provide a command to reorganize the desired axis (e.g., by selecting an axis label corresponding to the desired primary dimension, as described above). As another example, a user might wish to filter the pivot table to display only a subset of the entities within one or more of the hierarchies and therefore might select such a subset from each of one or more of the hierarchies (e.g., by choosing entities from a list, as described above). Upon receiving the command and/or selection, the configurator may be configured to redisplay the pivot table in accordance with the user's command/selection (block 335).

It should be noted that, while some of the examples provided by the method 300 contemplates the use of a table (and, specifically a pivot table) to allow the user to provide input for defining the structural hierarchy of the organization, other facilities can be used to receive user input, and that the invention, therefore is not limited to any particular input facility.

After providing any desired input and/or viewing the pivot table from a variety of perspectives (if desired), if the user is satisfied that the pivot table reflects the structural hierarchy of the organization, the user may confirm that the pivot table is correct (e.g., by providing input via a button, command, etc.). Upon receiving that confirmation (block 340), the configurator optionally will display the structural hierarchy for the user (block 345), e.g. by displaying a finalized version of the pivot table, by displaying a list of business units and their respective locations within the structural hierarchy, etc.

In one set of embodiments, the method comprises defining a data structure used by the enterprise application (block 350), based at least in part on the structural hierarchy defined by the user (e.g., based at least in part on the set of input provided by the user). For instance, in a set of embodiments, defining the data structure(s) used by the enterprise application comprises generating and/or modifying one or more tables in a database used by the enterprise application (block 355). Examples of such procedures are described above. These tables then may be stored on a computer readable storage medium (i.e., a hard disk drive, an array of drives, a storage area network, an optical drive, etc.) (block 360), so that the enterprise application can be implemented using the tables generated and/or modified by the configurator. (Of course, in some embodiments, additional tables may be generated and/or modified by other processes as part of the implementation procedure for the enterprise application.)

In some cases, the configurator performs additional modification/customization of the enterprise application to account for the structural hierarchy of the organization. Merely by way of example, the configurator might modify metadata used by the enterprise application, specify particular modules of the enterprise application that should be installed, uninstalled, configured and/or customized, etc.

Figure 4:
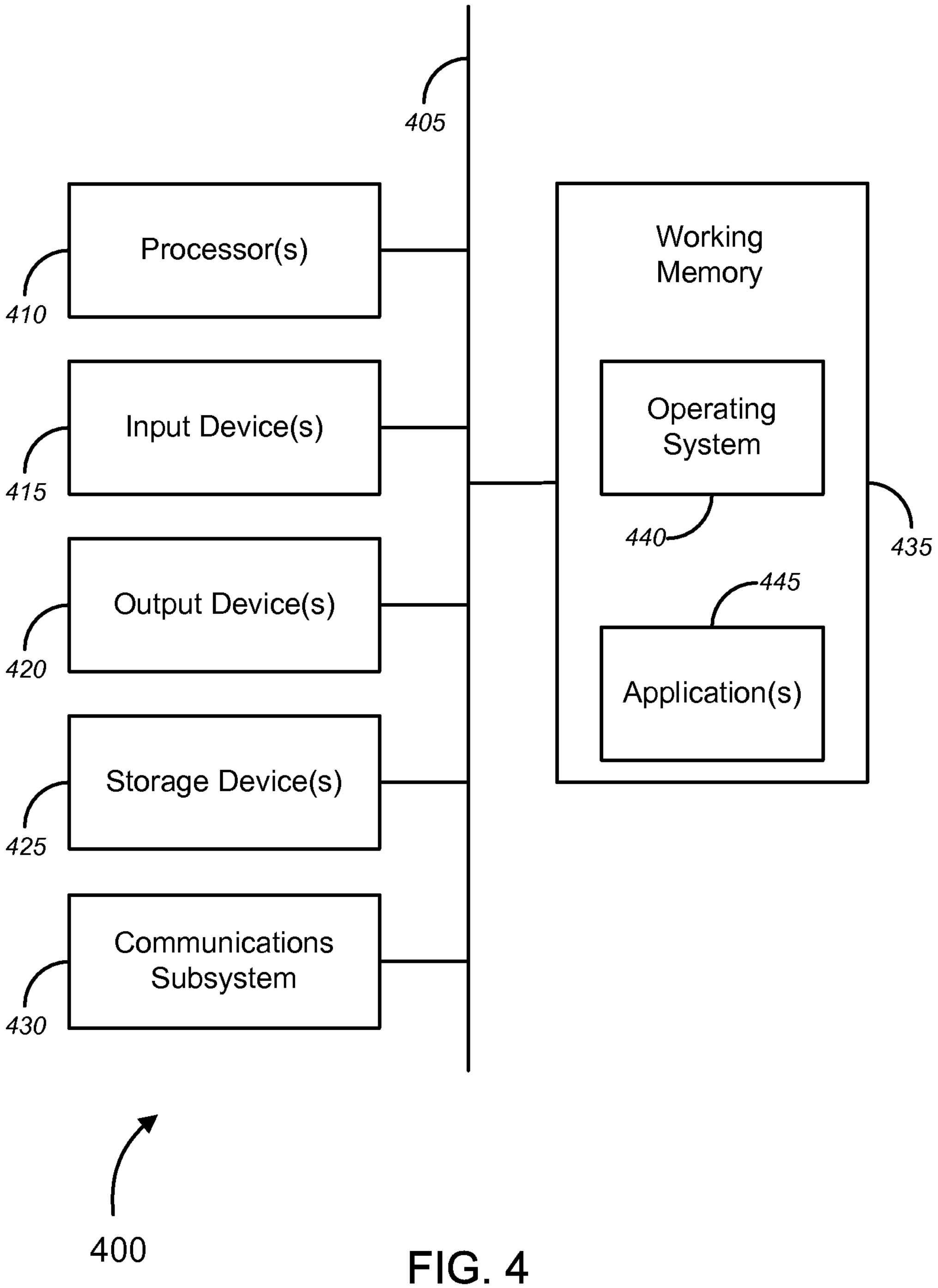
FIG. 4 is a generalized schematic diagram illustrating a computer system that can be used in accordance with various embodiments of the invention.

FIG. 4 provides a schematic illustration of one embodiment of a computer system 400 that can perform the methods of the invention, as described herein, and/or can function as a user computer (on which a user interface is displayed and/or a configurator runs, a server computer (which might be an application server for the enterprise application, a database server, a web server, a server for a configurator application and/or the like). It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 400 might also include a communications subsystem 430; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 430 may permit data to be exchanged with a network (such as the network 610 described below), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention (such as a configurator program, an enterprise application, a database server and/or client, a web server and/or browser, etc.) and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), such that the storage medium can be used to program a generic computer with the instructions stored thereon. These instructions might take the form of executable code, which is executable by the computer system 400 and/or might take the form of installable code, which, upon installation on the computer system 400 (e.g., using any of a variety of generally available installation programs, compression/decompression utilities, etc.) then takes the form of executable code.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 causes the processor(s) 410 to perform one or more procedures of the methods described herein.

The terms "machine readable medium" and "computer readable medium," as used herein, refer to any medium that participates in providing data that causes a machine (e.g., a computer) to operation in a specific fashion. In an embodiment implemented using the computer system 400, various machine-readable media might be involved in providing instructions to processor(s) 410 for execution. In many implementations, a machine-readable medium is a physical and/or tangible medium. Such a medium may take many forms, including but not limited to, non-volatile media, volatile media, and transmission media. Non-volatile media includes, for example, optical or magnetic disks, such as the storage device(s) 425. Volatile media includes, without limitation dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves, including without limitation radio, acoustic and/or light waves, such as those generated during radio-wave and infra-red data communications.

Common forms of physical and/or tangible machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to the processor(s) 410 for execution. Merely by way of example, the instructions may initially be carried on a magnetic disk and/or optical disc of a remote computer. The remote computer might load the instructions into its dynamic memory and send the instructions as signals over a transmission medium. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
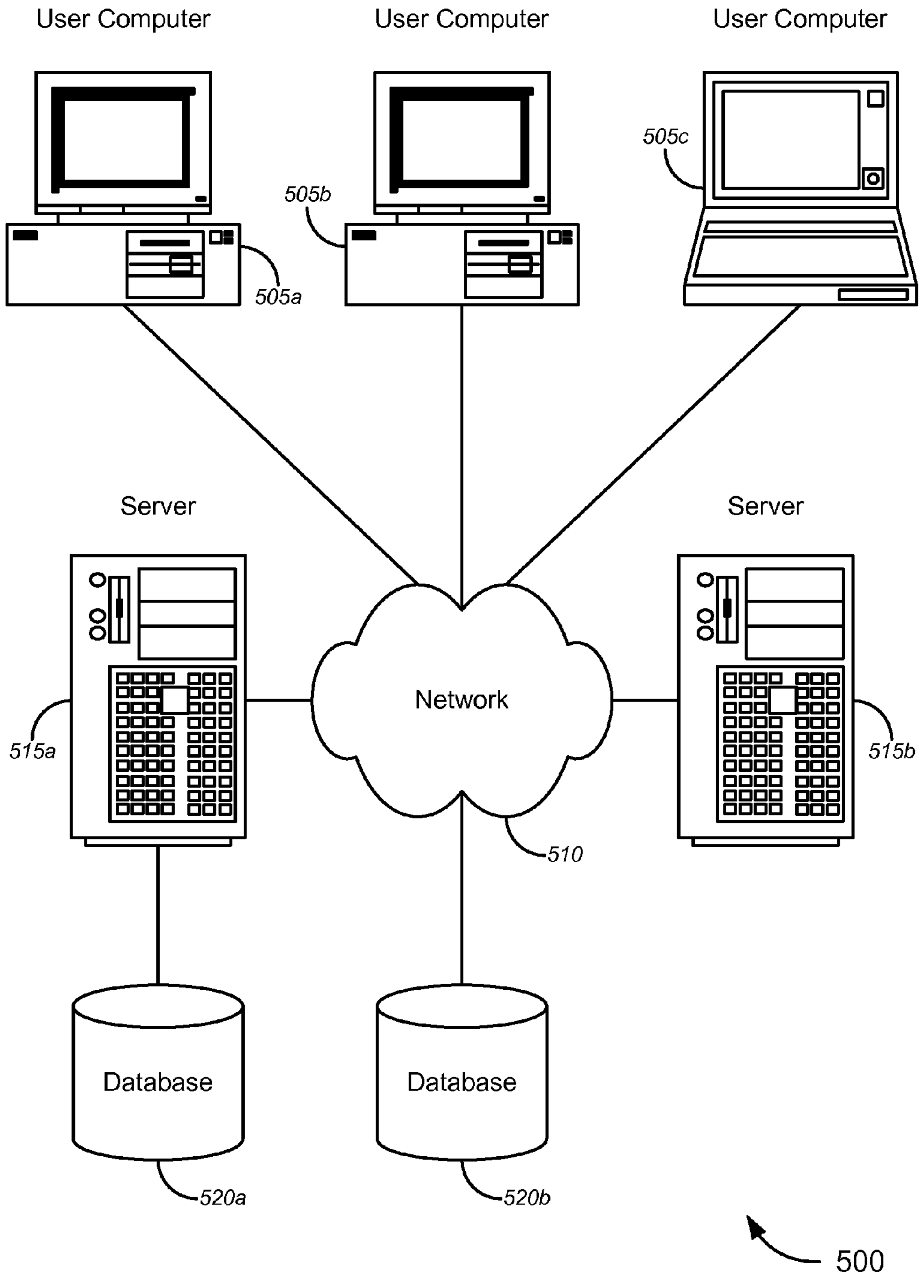
FIG. 5 is a block diagram illustrating a networked system of computers that can be used in accordance with various embodiments of the invention.

A set of embodiments comprises systems for configuring an enterprise application, such as by defining one or more data structures used by the enterprise application. Merely by way of example, FIG. 5 illustrates a block diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, as described above. Alternatively, the user computers 505 can be any other electronic device, such as a thin-client computer, Internet-enabled mobile telephone, and/or personal digital assistant, capable of communicating via a network (e.g., the network 510 described below) and/or displaying and navigating web pages or other types of electronic documents. Although the exemplary system 500 is shown with three user computers, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system including without limitation any of those discussed above, as well as any commercially-available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one ore more file and or/application servers, which can include one or more applications (such as an enterprise application, a configurator application, etc.) accessible by a client running on one or more of the user computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention, to provide a user interface for a configurator application, etc.). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 505 and/or another server 515. In some embodiments, an application server can create web pages dynamically for displaying information in accordance with embodiments of the invention, such as for displaying a user interface for a configurator application, receiving data via the user interface, etc. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server.

In accordance with further embodiments, one or more servers 515 can function as a file server and/or can include one or more of the files necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520*a* might reside on a storage medium local to (and/or resident in) a server 515*a* (and/or a user computer 505). Alternatively, a database 520*b* can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 is a relational database, such as an Oracle database, that is adapted to store, update, and retrieve data in response to SQL-formatted commands. The database might be controlled and/or maintained by a database server, as described above, for example. The database, in an aspect, might be configured to store one or more tables used by an enterprise application and/or generated/modified by a configurator program.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for configuring an enterprise software application for an organization, the method comprising:

receiving, with one or more processors associated with one or more computer systems, first input specifying a structural hierarchy of the organization using a first software application, the structural hierarchy including a first dimension that corresponds to a first sub-hierarchy and a second dimension that corresponds to a second sub-hierarchy, the first sub-hierarchy being associated with a first part of the organization and the second sub-hierarchy being associated to with a second part of the organization;

generating, with the one or more processors associated with the one or more computer systems, a spreadsheet file having a multidimensional pivot table using the structural hierarchy of the organization, the first software application being configured to facilitate an interaction with a second software application to enable the first software application to detect modifications made to the spreadsheet file and made using the second software application, the second software application operating independently of the first software application;

receiving, using the first software application at the one or more computer systems, a modified version of the spreadsheet file that includes added text at a position of the multidimensional pivot table, the added text having been received by the second software application in response to a second input;

determining, with the one or more processors associated with the one or more computer systems and using the first software application, a relationship between a first business unit represented in the first sub-hierarchy in the organization and one or more dimensions of the multidimensional pivot table representing a part of the second sub-hierarchy of the structural hierarchy of the organization, the determination being based on the added text having been received by the second software application; and customizing, with the one or more processors associated with the one or more computer systems, the enterprise software application using the first software application to account for the relationship determined between the first business unit represented in the first sub-hierarchy and the one or more dimensions representing the part of the second sub-hierarchy of the structural hierarchy of the organization;

wherein customizing the enterprise software application comprises:

defining a data structure;

wherein the data structure is configured to be used during execution of the enterprise software application.

2. The method of claim 1, wherein defining the data structure comprises creating one or more tables in a database used by the enterprise software application.

3. The method of claim 1, wherein defining the data structure comprises adding data to one or more tables in a database used by the enterprise software application, a table of the one or more tables corresponding to at least part of the first sub-hierarchy or at least part of the second sub-hierarchy.

4. The method of claim 3, wherein the data represents the relationship between the first business unit and a second business unit associated with the one or more dimensions.

5. The method of claim 1, wherein the data structure used by the enterprise software application comprises one or more database tables, and wherein the method further comprises storing the one or more database tables on a computer readable storage medium.

6. The method of claim 1, wherein determining the relationship between the first business unit in the organization and the one or more dimensions of the multidimensional pivot table comprises determining that the first business unit is associated with one or more business units represented in the second sub-hierarchy.

7. The method of claim 1, further comprising:

receiving a default structural hierarchy for the organization, and wherein determining the relationship between the first business unit in the organization and the one or more dimensions of the multidimensional pivot table comprises determining the relationship using default values, the default values reflecting information about the default structural hierarchy for the organization.

8. The method of claim 7, further comprising:

generating the spreadsheet file using the default values of the default structural hierarchy.

9. The method of claim 1, wherein the added text includes text modifying previous text at the position of the multidimensional pivot table.

10. The method of claim 1, wherein receiving the added text includes an identification of the first business unit.

11. The method of claim 1, wherein a first axis of the multidimensional pivot table is configured to be displayed horizontally on a display screen for a user, and wherein a second axis of the multidimensional pivot table is configured to be displayed vertically on the display screen.

12. The method of claim 1, wherein generating the spreadsheet file having the multidimensional pivot table comprises:

configuring a first axis to display rows categorized by the first sub-hierarchy in one or more sets of rows, each of the one or more sets of rows representing at least one entity of the first sub-hierarchy;

configuring the second axis to display columns categorized by the second sub-hierarchy in one or more first sets of columns, each of the one or more first sets of columns representing at least one entity of the second sub-hierarchy; and within each set of the one or more first sets of columns, configuring columns categorized by a third sub-hierarchy in one or more second sets of columns, each of the one or more second sets of columns representing at least one entity of the third sub-hierarchy.

13. The method of claim 1, wherein generating spreadsheet file having the multidimensional pivot table comprises:

configuring a first axis to display rows categorized by a legal structure of the organization in one or more sets of rows, each of the one or more sets of rows representing at least one of one or more legal entities of the legal structure;

configuring a second axis to display columns categorized by a functional structure of the organization in one or more sets of columns, each of the one or more sets of columns representing at least one of one or more functional entities of the functional structure; and configuring the second axis to display, within each set of the one or more sets of columns, one or more columns, each of the one or more columns representing at least one of one or more business entities of a business structure of the organization, wherein the first sub-hierarchy corresponds to one of the legal structure, functional structure and the business structure and the second sub-hierarchy corresponds to another of the legal structure, functional structure and the business structure.

14. The method of claim 12, further comprising:

receiving, via the user interface, a command to reorganize the second axis according to a third structure in the structural hierarchy of the organization; and in response to the command, configuring the second axis of the multidimensional pivot table to display columns categorized by the third structure of the organization.

15. The method of claim 13, further comprising:

receiving a selection of a subset of legal entities to be displayed by the multidimensional pivot table, a selection of a subset of business units to be displayed by the multidimensional pivot table, and a selection of a subset of functional units to be displayed by the multidimensional pivot table; and redisplaying the multidimensional pivot table based in the selection.

16. The method of claim 1, further comprising, displaying, for a user, a representation of a structural hierarchy, the representation of the structural hierarchy including a representation of the first sub-hierarchy and a representation of the second sub-hierarchy, wherein the second input is received subsequent to the display of the representation of the structural hierarchy, and wherein the display is updated in response to the second input.

17. The method of claim 1, wherein receiving the first input specifying the structural hierarchy of the organization using the first software application comprises receiving data from a web browser.

18. A computer system comprising:

one or more processors; and one or more non-transitory computer readable storage media in communication with the one or more processors, the one or more non-transitory computer readable storage media having stored thereon computer program comprising a set of instructions which when execute by the one or more processors configure the one or more processors to:

receive first input specifying a structural hierarchy of the organization using a first software application, the structural hierarchy including a first dimension that corresponds to a first sub-hierarchy and a second dimension that corresponds to a second sub-hierarchy, the first sub-hierarchy being associated with a first part of the organization and the second sub-hierarchy being associated with to a second part of the organization;

generate a spreadsheet file having a multidimensional pivot table using the structural hierarchy of the organization, the first software application being configured to facilitate an interaction with a second software application to enable the first software application to detect modifications made to the spreadsheet file and made using the second software application, the second software application operating independently of the first software application;

receiving, using the first software application at the one or more computer systems, a modified version of the spreadsheet file that includes added text at a position of the multidimensional pivot table, the added text having been received by the second software application in response to a second input;

determine, using the first software application, a relationship between a first business unit represented in the first sub-hierarchy in the organization and one or more dimensions of the multidimensional pivot table representing a part of the second sub-hierarchy of the structural hierarchy of the organization, the determination being based on the added text having been received by the second software application; and configure the enterprise software application using the first software application to account for the relationship determined between the first business unit represented in the first sub-hierarchy and the one or more dimensions representing the part of the second sub-hierarchy of the structural hierarchy of the organization;

wherein configure the enterprise software application comprises:

defining a data structure;

wherein the data structure is configured to be used during execution of the enterprise software application.

19. The computer system of claim 18, wherein the enterprise software application comprises the computer program.

20. The computer system of claim 18, wherein the computer system comprises a first computer having a first storage medium on which the enterprise software application is stored, and a second computer having a second storage medium on which the computer program is stored.

21. The computer system of claim 18, wherein defining the data structure comprises creating or modifying one or more tables in a database.

22. A method of deploying an enterprise software application, the method comprising:

generating, with one or more processors associated with one or more computer systems, information configured to display a user interface, the user interface comprising one or more user interfaces elements that define a structural hierarchy of an organization comprising one or more business units;

receiving, at the one or more computer system, information specified via the user interface about the organization, the information comprising an identification of each of one or more entities in each hierarchy in a plurality of hierarchies of the organization, each hierarchy in the plurality of hierarchies having a different type of organizational hierarchy;

generating for the user interface, using a first software application and the one or more processors associated with the one or more computer systems, a multidimensional pivot table with a first axis and a second axis, the first axis comprising a first hierarchy in the plurality of hierarchies of the organization, the first hierarchy comprising a first type of organizational hierarchy, the second axis comprising a plurality of columns representing business units in a second hierarchy in the plurality of hierarchies of the organization; the second hierarchy comprising a second type of organizational hierarchy, the multidimensional pivot table further comprising one or more user input elements at each intersection of a row of the multidimensional pivot table corresponding to the first axis and a column of the plurality of columns corresponding to the second axis to input a business unit from the second hierarchy, the multidimensional pivot table being configured to be displayed using a second software application, the first software application being configured to facilitate an interaction with the second software application to enable the first software application to detect modifications made to the multidimensional pivot table using the second software application, the second software application operating independently of the first software application;

receiving, using the first software application a modified version of the multidimensional pivot table including, added text at the one or more input elements of the multidimensional pivot table, the added text having been received by the second software application in response to an input specified via the or more input elements of the multidimensional pivot table;

determining, with the one or more processors associated with the one or more computer systems and using the first software application, one or more relationships between the first hierarchy and the second hierarchy of the organization using the multidimensional pivot table and the added text received at the or more input elements of the multidimensional pivot table; and customizing the enterprise software application to account for the one or more relationships determined between the first structural hierarchy and the second structural hierarchy of the organization;

wherein customizing the enterprise software application comprises:

defining a data structure;

wherein the data structure is configured to be used during execution of the enterprise software application.

23. The method of claim 22, further comprising:

providing a default structural hierarchy for the organization.

24. The method of claim 23, wherein the added text corresponds to a modification of the default structural hierarchy.

25. The method of claim 23, wherein the default structural hierarchy is defined, at least in part, based on other input received using the first software application.

26. The method of claim 22, wherein the first hierarchy and the second hierarchy in the plurality of hierarchies of the organization are selected from a group consisting of a functional structure, a business structure and a legal structure.

27. The method of claim 22, further comprising:

displaying, for a user and using the second software application, the multidimensional pivot table.

28. A non-transitory computer readable storage medium having encoded thereon a first software application comprising a set of instructions executable by a computer system to configure an enterprise software application, the set of instructions comprising:

instructions for generating information configured to display a user interface, the user interface comprising one or more user interfaces elements that define a structural hierarchy of an organization comprising one or more business units;

instructions for receiving information specified via the user interface about the organization, the information comprising an identification of each of one or more entities in each hierarchy in a plurality of hierarchies of the organization, each hierarchy in the plurality of hierarchies having a different type of organization hierarchy;

instructions for generating for the user interface a multidimensional pivot table with a first axis and a second axis, the first axis comprising a first hierarchy in the plurality of hierarchies of the organization, the first hierarchy comprising a first type of organizational hierarchy, the second axis comprising a plurality of columns representing business units in a second hierarchy in the plurality of hierarchies of the organization; the second hierarchy comprising a second type of organizational hierarchy, the multidimensional pivot table further comprising one or more user input elements at each intersection of a row of the multidimensional pivot table corresponding to the first axis and a column of the plurality of columns corresponding to the second axis to input a business unit from the second hierarchy, the multidimensional pivot table being configured to be displayed using a second software application, the first software application being configured to facilitate an interaction with the second software application to enable the first software application to detect modifications made to the multidimensional pivot table using the second software application, the second software application operating independently of the first software application;

instructions for receiving added text at the one or more input elements of the multidimensional pivot table, the added text having been identified by the second software application in response to an input specified via the multidimensional pivot table of the user interface;

instructions for determining one or more relationships between the first hierarchy and the second hierarchy of the organization using the multidimensional pivot table and the added text received at the or more input elements of the multidimensional pivot table; and instructions for customizing the enterprise software application to account for the one or more relationships determined between the first hierarchy and the second hierarchy of the organization and the text received at the or more input elements of the multidimensional pivot table;

wherein customizing the enterprise software application comprises:

defining a data structure;

wherein the data structure is configured to be used during execution of the enterprise software application.

29. A non-transitory machine-readable storage medium, including instructions configured to cause one or more data processors to perform actions including:

receiving first input specifying a structural hierarchy of the organization using a first software application, the structural hierarchy including a first dimension that corresponds to a first sub-hierarchy and a second dimension that corresponds to a second sub-hierarchy, the first sub-hierarchy being associated with a first part of the organization and the second sub-hierarchy being associated with a second part of the organization:

generating a spreadsheet file having a multidimensional pivot table using the structural hierarchy of the organization, the first software application being configured to facilitate an interaction with a second software application to enable the first software application to detect modifications made to the spreadsheet file and made using the second software application, the second software application operating independently of the first software application;

receiving, using the first software application, a modified version of the spreadsheet file that includes added text at a position of the multidimensional pivot table, the added text having been received by the second software application in response to a second input;

determining, using the first software application, a relationship between a first business unit represented in the first sub-hierarchy in the organization and one or more dimensions of the multidimensional pivot table representing the second part of the second sub-hierarchy of the structural hierarchy of the organization, the determination being based on the added text having been received by the second software application; and customizing an enterprise software application using the first software application to account for the relationship determined between the first business unit represented in the first sub-hierarchy and the one or more dimensions representing the second part of the second sub-hierarchy of the structural hierarchy of the organization;

wherein customizing the enterprise software application comprises:

defining a data structure;

wherein the data structure is configured to be used during execution of the enterprise software application.

30. The non-transitory machine-readable storage medium of claim 29, wherein defining the data structure comprises creating one or more tables in a database used by the enterprise software application.

31. The non-transitory machine-readable storage medium of claim 29, wherein defining the data structure comprises adding data to one or more tables in a database used by the enterprise software application, a table of the one or more tables corresponding to at least part of the first sub-hierarchy or at least part of the second sub-hierarchy.

32. The non-transitory machine-readable storage medium of claim 29, wherein determining the relationship between the first business unit in the organization and the one or more dimensions of the multidimensional pivot table comprises determining that the first business unit is associated with one or more business units represented in the second sub-hierarchy.

33. The non-transitory machine-readable storage medium of claim 29, wherein a first axis of the multidimensional pivot table is configured to be displayed horizontally on a display screen for a user, and wherein a second axis of the multidimensional pivot table is configured to be displayed vertically on the display screen.

34. The non-transitory machine-readable storage medium of claim 29, wherein generating the spreadsheet file having the multidimensional pivot table comprises:

configuring a first axis to display rows categorized by the first sub-hierarchy in one or more sets of rows, each of the one or more sets of rows representing at least one entity of the first sub-hierarchy;

configuring a second axis to display columns categorized by the second sub-hierarchy in one or more first sets of columns, each of the one or more first sets of columns representing at least one entity of the second sub-hierarchy; and within each set of the one or more first sets of columns, configuring columns categorized by a third sub-hierarchy in one or more second sets of columns, each of the one or more second sets of columns representing at least one entity of the third sub-hierarchy.

* * * * *